(12) United States Patent
Lin (10) Patent No.: US 12,510,989 B2
(45) Date of Patent: Dec. 30, 2025

(54) TOUCHPAD

(71) Applicant: ELAN MICROELECTRONICS CORPORATION, Hsinchu (TW)

(72) Inventor: Yu-Kai Lin, Hsinchu (TW)

(73) Assignee: ELAN MICROELECTRONICS CORPORATION, Hsinchu (TW)

( * ) Notice: Subject to any disclaimer, the term of this patent is extended or adjusted under 35 U.S.C. 154(b) by 125 days.

(21) Appl. No.: 18/476,831

(22) Filed: Sep. 28, 2023

(65) Prior Publication Data

US 2024/0118767 A1 Apr. 11, 2024

(30) Foreign Application Priority Data

Oct. 7, 2022 (TW) .................................. 111138304

(51) Int. Cl.
*G06F 3/041* (2006.01)
*G06F 3/044* (2006.01)

(52) U.S. Cl.
CPC ........ *G06F 3/04164* (2019.05); *G06F 3/0446* (2019.05); *G06F 2203/04102* (2013.01); *G06F 2203/04107* (2013.01)

(58) Field of Classification Search
CPC ............... G06F 3/04164; G06F 3/0446; G06F 2203/04102; G06F 2203/04107
See application file for complete search history.

(56) References Cited

U.S. PATENT DOCUMENTS

| | | | |
|---|---|---|---|
| 2013/0106781 A1* | 5/2013 | Oh ........................ | G06F 3/0446 345/174 |
| 2020/0033651 A1 | 1/2020 | Yeh | |
| 2022/0300116 A1* | 9/2022 | Zhang ................... | G06F 3/0412 |

FOREIGN PATENT DOCUMENTS

| | | |
|---|---|---|
| TW | 201531914 A | 8/2015 |
| TW | I544384 B | 8/2016 |

* cited by examiner

*Primary Examiner* — Deeprose Subedi
(74) *Attorney, Agent, or Firm* — patenttm.us (57) ABSTRACT

A touchpad has a substrate, a sensing panel and a cover stacked in a sequence. The sensing panel has multiple sensing traces formed thereon. At least one flexible connecting board is connected between the sensing panel and the substrate via its end. The connecting board has multiple extending traces formed thereon, which are thinner than the sensing traces, to form an electrical connection between the sensing traces and the controller on the substrate. The flexible connecting board is used to avoid the problem of trace breakage caused by direct bending of the end of the sensing panel, and the sensing traces are collected by extending traces with smaller line widths so as to reduce the width of the boundary area effectively.

12 Claims, 8 Drawing Sheets

TOUCHPAD

CROSS-REFERENCE TO RELATED APPLICATIONS

This application is based upon and claims priority under 35 U.S.C. 119 from Taiwan Patent Application No. 111138304 filed on Oct. 7, 2022, which is hereby specifically incorporated herein by this reference thereto.

BACKGROUND OF THE INVENTION

1. Field of the Invention

The present invention relates to a touchpad, especially to the electrical circuit of the touchpad.

2. Description of the Prior Arts

Traditional electronic devices usually use a keyboard or mouse as an input device for control commands. With the evolution of technology, the touchpad has also become one of the input devices. Almost all notebook computers today are equipped with touchpads. When the functions provided by notebook computers become more and more complex, traditional touchpads are no longer sufficient in size or function. Therefore, a conventional large-size touchpad has been developed in the prior art, and the widened conventional touchpad is used to increase the input area of control commands.

Figure 7:
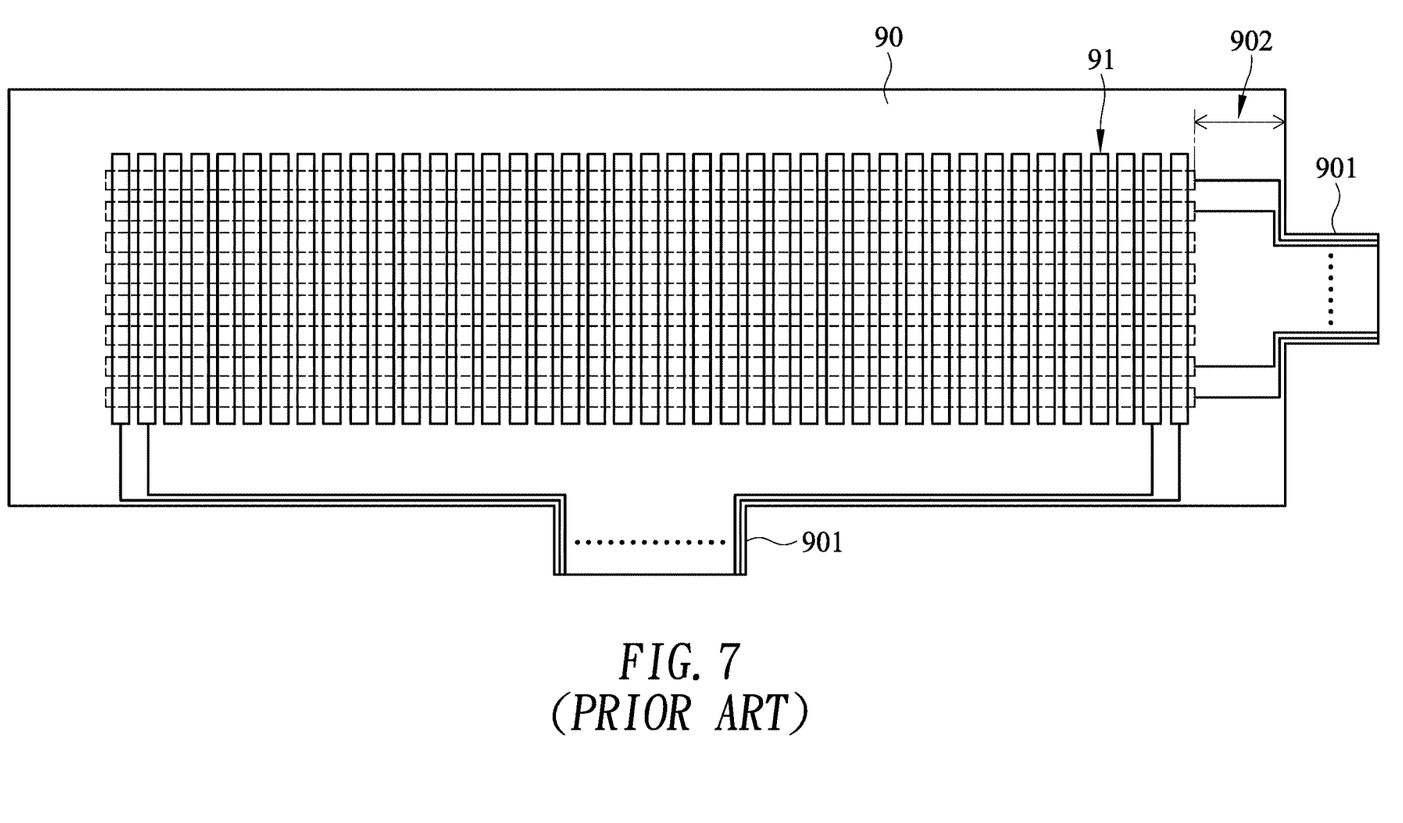
FIG. 7 is a top view of a conventional touchpad in accordance with the present invention without a cover.
Figure 8:
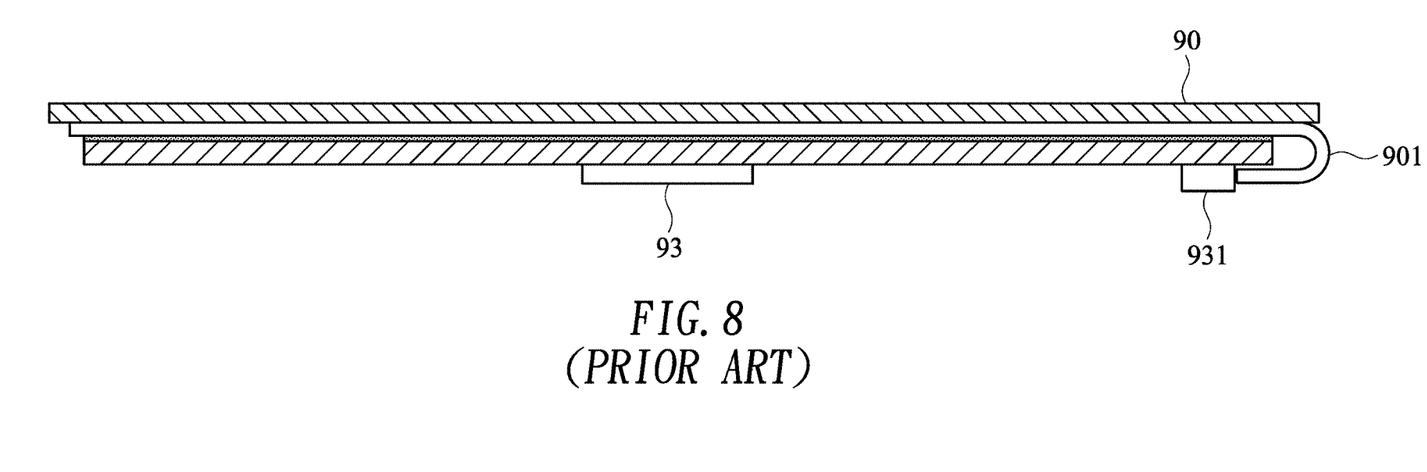
FIG. 8 is a side view in a partial section of the conventional touchpad in FIG. 7.

With reference to FIGS. 7 and 8, the conventional large-size touchpad comprises a sensing panel 90 with sensing traces 91 arranged on the sensing panel 90. The sensing panel 90 is provided with a bendable connecting portion 901 on its side. The bendable connecting portion 901 is bent downward and connected to a controller 93 below through a connector 931. The sensing traces 91 converge at the connecting portion 901 to electrically connect to the controller 93. As the size of the touchpad increases, more sensing traces 91 are required. Due to cost considerations, the material of the conventional sensing panel 90 is a membrane, and the sensing traces 91 are formed on the sensing panel 90 by printing. Therefore, there is a process limit on the minimum trace pitch. When converging to the connecting portion 901 at the side, a wider border area 902 is needed to allow the sensing traces 91 to converge at the connecting portion 901. However, a wider border area 902 means a wider non-active area of the touchpad, where users cannot generate a normal touch-sensing effect. For usability, a narrower border area 902 is generally preferred. Furthermore, the circuits printed on the connecting portion 901 are prone to break due to the bending of the connecting portion 901. Once broken, the touchpad is completely disabled, significantly affecting the product's yield rate.

SUMMARY OF THE INVENTION

To overcome the shortcomings, the present invention provides a touchpad to improve the issues of excessive width in the border area and susceptibility to wire breakage at the bending portion of large-size touchpads.

To achieve the objectives, the present invention provides a touchpad comprising: a substrate having a control chip; a sensing panel disposed on the substrate and having multiple sensing traces; at least one connecting board flexibly connecting between the substrate and the sensing panel, and each of the at least one connecting board having multiple extending traces, wherein each of the extending traces is connected electrically between the controller and a corresponding one of the sensing traces, a material of the at least one connecting board differs from that of the sensing panel, and each of the extending traces is thinner than each of the sensing traces; and a cover disposed on the sensing panel.

Other objectives, advantages and novel features of the invention will become more apparent from the following detailed description when taken in conjunction with the accompanying drawings.

DETAILED DESCRIPTION OF THE EMBODIMENTS

With reference to the attached drawings, the present invention is described by means of the embodiment(s) below where the attached drawings are simplified for illustration purposes only to illustrate the structures or methods of the present invention by describing the relationships between the components and assembly in the present invention. Therefore, the components shown in the figures are not expressed with the actual numbers, actual shapes, actual dimensions, or the actual ratio. Some of the dimensions or dimension ratios have been enlarged or simplified to provide a better illustration. The actual numbers, actual shapes, or actual dimension ratios can be selectively designed and disposed and the detailed component layouts may be more complicated.

Figure 1:
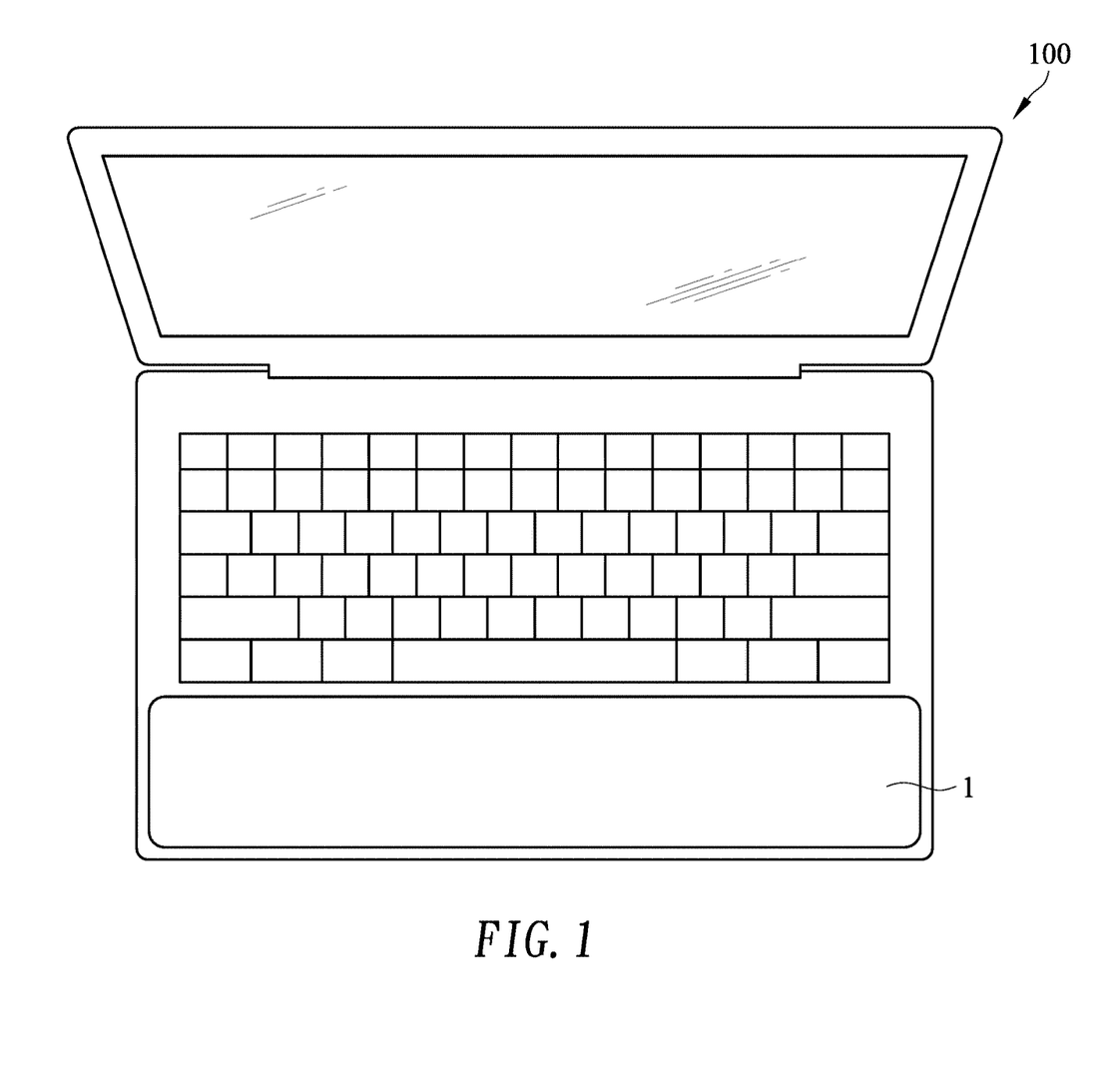
FIG. 1 is an operational perspective view of a notebook computer with a first embodiment of a touchpad in accordance with the present invention.
Figure 2:
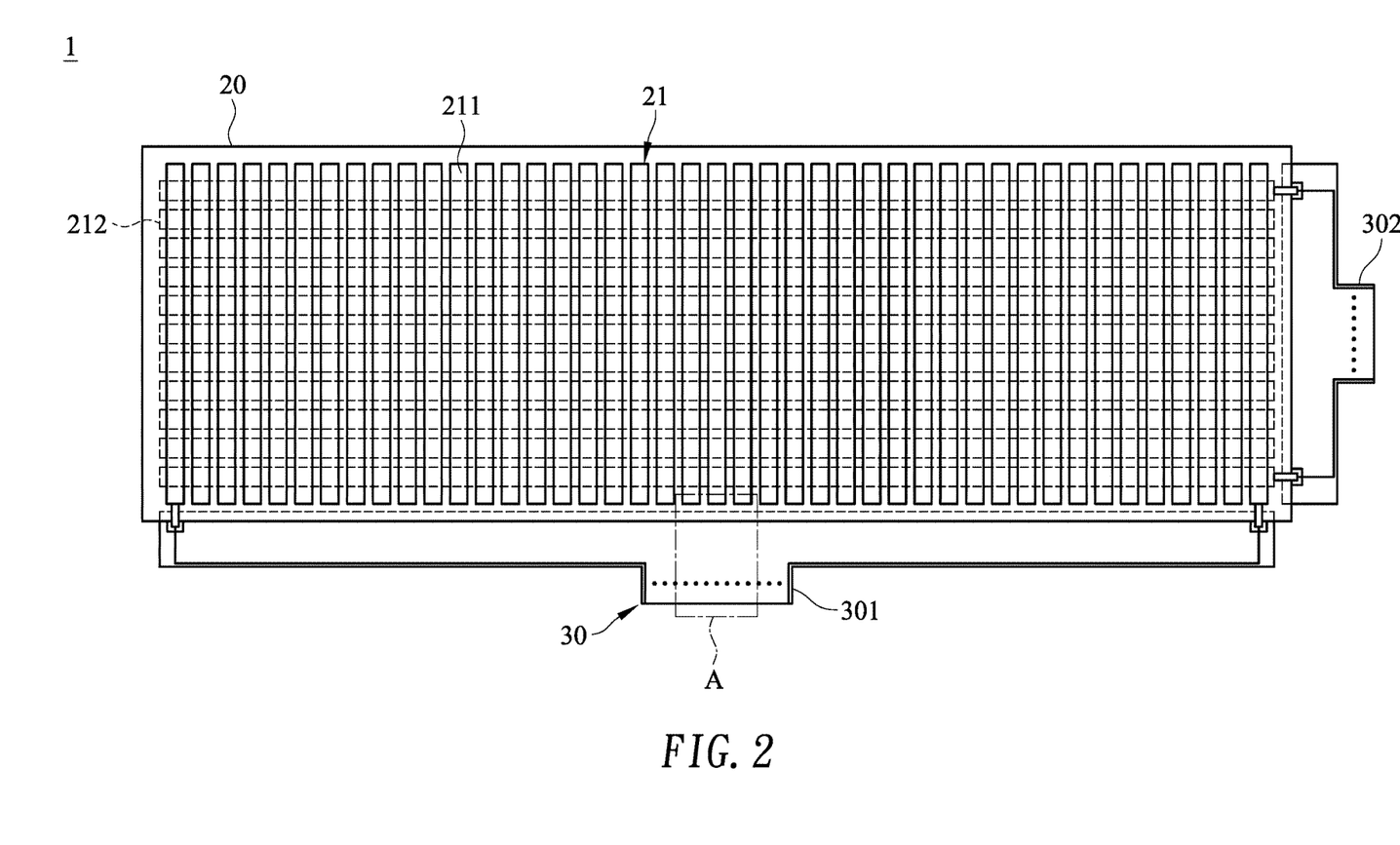
FIG. 2 is an illustrative top view of the touchpad in FIG. 1 without a cover.
Figure 3:
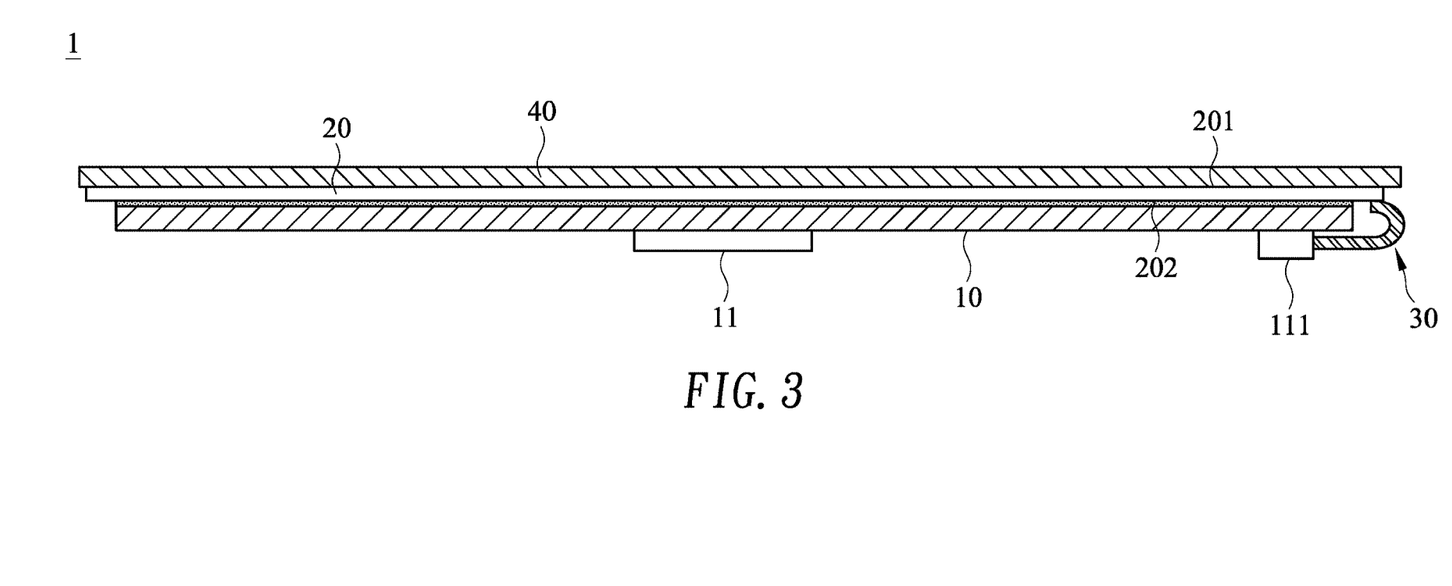
FIG. 3 is a side view in a partial section of the touchpad in FIG. 1.

With reference to FIG. 1, a touchpad 1 in accordance with the present invention is mounted on an electronic device, such as a notebook computer 100 shown in FIG. 1, and is used as one of the input devices of the notebook computer 100. With reference to FIGS. 2 and 3, the touchpad 1 comprises a substrate 10, a sensing panel 20, at least one connecting board 30, and a cover 40.

A controller 11, multiple passive components, and circuits are mounted on the substrate 10, with both the passive components and the circuits electrically connecting to the controller 11.

Figure 4:
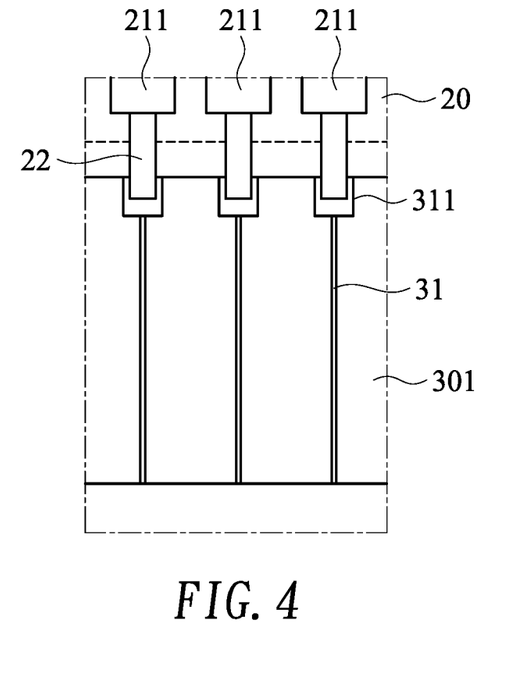
FIG. 4 is an enlarged top view of the A-A part shown in FIG. 2.

With reference to FIGS. 2 to 4, the sensing panel 20 is mounted on the substrate 10 and has multiple sensing traces 21. The sensing traces 21 are used to provide touch sensing information. When the user operates the touchpad 1, the sensing traces 21 generate capacitance changes in response to the user's touch. These capacitance changes constitute touch-sensing information for determining the user's operating actions or gestures. In one embodiment, the sensing traces 21 include multiple first sensing traces 211 and multiple second sensing traces 212. The first sensing traces 211 are arranged in parallel with spaced intervals, and the second sensing traces 212 are also arranged in parallel with spaced intervals. The first sensing traces 211 intersect with the second sensing traces 212 in a matrix. In one embodiment, each of the sensing traces 21 has a lead 22 at an end thereof. The width of each sensing trace 21 is greater than the width of each lead 22.

The at least one connecting board 30 flexibly connects between the substrate 10 and the sensing panel 20. The material of the at least one connecting board 30 differs from that of the sensing panel 20. In one embodiment, the sensing panel 20 is a membrane, and the sensing traces 21 are printed on the sensing panel 20, such as printed by silver traces. The at least one connecting board 30 is a flexible printed circuit board. Each of the least one connecting board 30 has multiple extending traces 31 formed thereon. The extending traces 31 may be formed on the connecting board 30 through an etching process. One end of each extending trace 31 corresponds to and electrically connects to a corresponding one of the sensing traces 21, while the other end of each extending trace 31 electrically connects to the controller 11 on the substrate 10. The width of each extending traces 31 is smaller than the width of each sensing traces 21. The extending traces 31 may electrically connect to the controller 11 through a connector 111 or through predefined circuits on the substrate 10. In one embodiment, each of the extending traces 31 electrically connects to one of the sensing traces 21 through a conductive film, which can be an anisotropic conductive film (ACF). In one embodiment, each of the sensing traces 21 electrically connects to the corresponding extending trace 31 through a corresponding lead 22. The width of each extending traces 31 is smaller than the width of each leads 22. In one embodiment, each of the at least one connecting board 30 has multiple connecting pads 311 formed thereon. Each of the sensing traces 21 electrically connects to the corresponding extending trace 31 through the corresponding lead 22 and a corresponding connecting pad 311.

Figure 5:
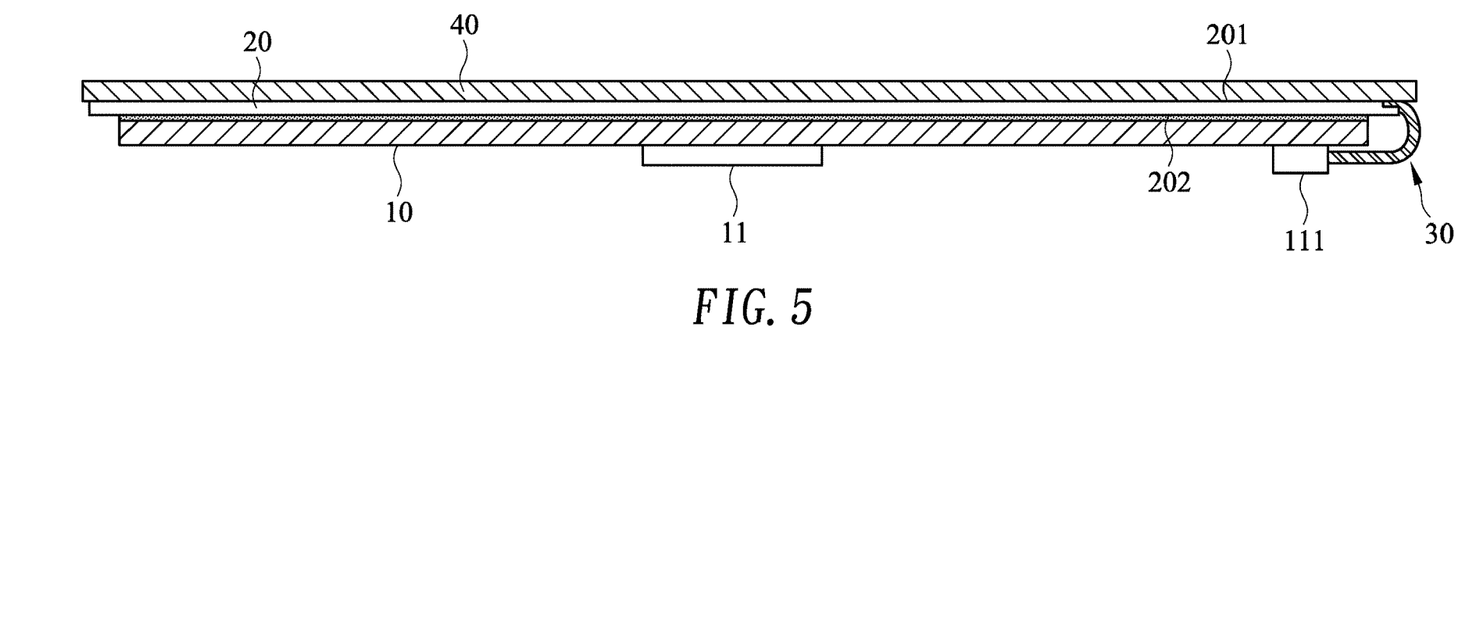
FIG. 5 is a side view in a partial section of a second embodiment of a touchpad in accordance with the present invention.
Figure 6:
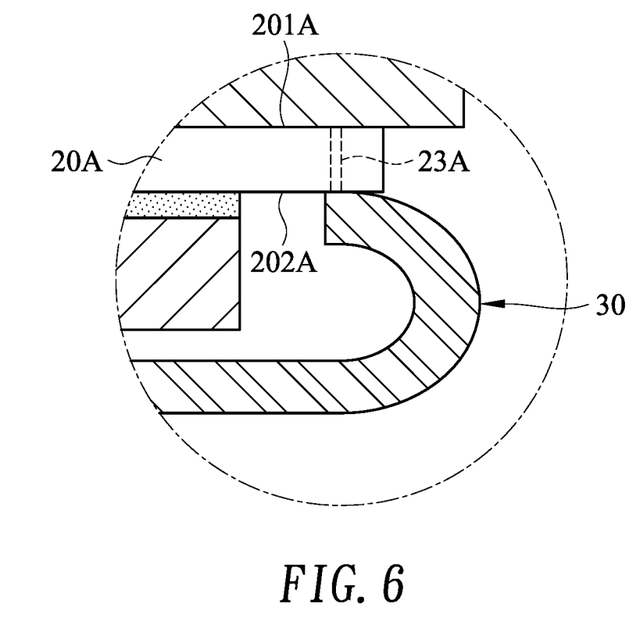
FIG. 6 is an enlarged side view in a partial section of a third embodiment of a touchpad in accordance with the present invention.

The connection position between the connecting board 30 and the sensing panel 20 can be adjusted according to requirements. For example, the sensing traces 21 and the connecting board 30 are positioned on the same side, meaning the sensing traces 21 are located on the first side 201 of the sensing panel 20, and the position where the connecting board 30 is connected to the sensing panel 20 is also on the first side 201 (as shown in FIG. 5). Alternatively, the sensing traces 21 are positioned on the second side 202 of the sensing panel 20, and the position where the connecting board 30 is connected to the sensing panel 20 is also on the second side 202 (as shown in FIG. 3). Furthermore, the sensing traces 21 and the connecting board 30 can be positioned on different sides. For instance, the sensing traces 21 are placed on the first side 201A of the sensing panel 20A, while the position where the connecting board 30 is connected to the sensing panel 20A is on the second side 202A. The sensing traces 21 are electrically connected to the corresponding extending traces 31 on the connecting board 30 through a number of conductive through-holes 23A formed through the sensing panel 20A (as shown in FIG. 6).

In one embodiment, the sensing traces 21 include the first sensing traces 211 and the second sensing traces 212 as aforementioned. The first sensing races 211 are formed on the first side 201 of the sensing panel 20. The second sensing traces 212 are formed on the second side 202 of the sensing panel 20. In this embodiment, the connecting board 30 includes a first connecting board 301 and a second connecting board 302. The first connecting board 301 and the second connecting board 302 are connected to the same side of the sensing panel 20. For example, both of the first connecting board 301 and the second connecting board 302 are connected to the second side 202 of the sensing panel 20. In this configuration, the first sensing traces 211 positioned on the first side 201 electrically connect to the extending traces 31 on the first connecting board 301 through a number of conductive through-holes 23A formed through the sensing panel 20. Alternatively, the first connecting board 301 is connected to the first side 201 where the first sensing traces 211 are positioned, while the second connecting board 302 is connected to the second side 202 where the second sensing traces 212 are positioned.

The cover 40 is disposed on the sensing panel 20. In one embodiment, the cover 40 is disposed on the first side 201 of the sensing panel 20.

In conclusion, the touchpad 1 as described achieves electrical connection between the sensing panel 20 and the substrate 10 with different materials by utilizing the flexible connecting board 30. This approach avoids the issue of wire breakage that may occur when directly bending the end of the sensing panel 20. Furthermore, by implementing advanced processes to position the extending traces 31 with narrower widths on the connecting board 30, the sensing traces 21 are gathered and electrically connected to the controller 11, reducing the required boundary width at the collection point and effectively minimizing the size of the boundary area.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A touchpad comprising:
   a substrate;
   a controller mounted on the substrate;
   a sensing panel disposed on the substrate, having multiple sensing traces and having a first side and a second side;
   at least one connecting board flexibly connecting between the substrate and the sensing panel, and each of the at least one connecting board having multiple extending traces, wherein each of the extending traces corresponds to one of the sensing traces, each of the extending traces is connected electrically between the controller and the corresponding one of the sensing traces through a conductive film, a material of the at least one connecting board differs from that of the sensing panel, and a width of each of the extending traces is smaller than a width of each of the sensing traces; and
   a cover disposed on the first side of the sensing panel, wherein
   the substrate is disposed on the second side of the sensing panel;
   the sensing traces are formed on the second side of the sensing panel; and
   the at least one connecting board is connected to the second side of the sensing panel.

2. The touchpad as claimed in claim 1, wherein
the sensing panel is a membrane; and
the sensing traces are printed on the sensing panel.

3. The touchpad as claimed in claim 1, wherein
the at least one connecting board is a flexible printed circuit board; and
the extending traces are formed on the at least one connecting board through an etching process.

4. A touchpad comprising:
a substrate;
a controller mounted on the substrate;
a sensing panel disposed on the substrate, having multiple sensing traces and having a first side and a second side;
at least one connecting board flexibly connecting between the substrate and the sensing panel, and each of the at least one connecting board having multiple extending traces, wherein each of the extending traces corresponds to one of the sensing traces, each of the extending traces is connected electrically between the controller and the corresponding one of the sensing traces through a conductive film, a material of the at least one connecting board differs from that of the sensing panel, and a width of each of the extending traces is smaller than a width of each of the sensing traces; and
a cover disposed on the first side of the sensing panel, wherein
the substrate is disposed on the second side of the sensing panel;
the sensing traces are formed on the first side of the sensing panel; and
the at least one connecting board is connected to the first side of the sensing panel and an end of each of the at least one connecting board connecting to the sensing panel is disposed between the cover and the first side of the sensing panel.

5. A touchpad comprising:
a substrate;
a controller mounted on the substrate;
a sensing panel disposed on the substrate, having multiple sensing traces and having a first side and a second side, wherein each of the sensing traces has a lead formed on an end thereof;
at least one connecting board flexibly connecting between the substrate and the sensing panel, and each of the at least one connecting board having multiple extending traces, wherein each of the extending traces corresponds to one of the sensing traces, each of the extending traces is connected electrically between the controller and the corresponding one of the sensing traces through the lead of the corresponding one of the sensing traces, a material of the at least one connecting board differs from that of the sensing panel, a width of each of the leads is larger than the width of each of the extending traces, and a width of each of the extending traces is smaller than a width of each of the sensing traces; and
a cover disposed on the first side of the sensing panel, wherein
the substrate is disposed on the second side of the sensing panel;
the sensing traces include
multiple first sensing traces arranged in parallel with spaced intervals; and
multiple second sensing traces arranged in parallel with spaced intervals and intersecting with the first sensing traces in a matrix; and
the at least one connecting board includes
a first connecting board, wherein each of the extending traces on the first connecting board electrically connects to a corresponding one of the first sensing traces; and
a second connecting board, wherein each of the extending traces on the second connecting board electrically connects to a corresponding one of the second sensing traces.

6. The touchpad as claimed in claim 5, wherein
a width of each of the leads is larger than the width of each of the extending traces.

7. The touchpad as claimed in claim 5, wherein each of the extending traces electrically connects to a lead of the corresponding one of the sensing traces through a conductive film.

8. The touchpad as claimed in claim 5, wherein
the sensing panel is a membrane; and
the sensing traces are printed on the sensing panel.

9. The touchpad as claimed in claim 5, wherein
the at least one connecting board is a flexible printed circuit board; and
the extending traces are formed on the at least one connecting board through an etching process.

10. The touchpad as claimed in claim 5, wherein
the first sensing traces formed on the first side of the sensing panel;
the second sensing traces formed on the second side of the sensing panel;
the first connecting board and the second connecting board connect to the second side of the sensing panel;
the sensing panel has multiple conductive through-holes formed therethrough; and
each of the extending traces on the first connecting board electrically connects to the corresponding one of the first sensing traces through a corresponding one of the conductive through-holes.

11. A touchpad comprising:
a substrate;
a controller mounted on the substrate;
a sensing panel disposed on the substrate, having multiple sensing traces and having a first side and a second side;
at least one connecting board flexibly connecting between the substrate and the sensing panel, and each of the at least one connecting board having multiple extending traces, wherein each of the extending traces corresponds to one of the sensing traces, each of the extending traces is connected electrically between the controller and the corresponding one of the sensing traces through a conductive film, a material of the at least one connecting board differs from that of the sensing panel, and a width of each of the extending traces is smaller than a width of each of the sensing traces; and
a cover disposed on the first side of the sensing panel, wherein
the substrate is disposed on the second side of the sensing panel;
the sensing traces include
multiple first sensing traces arranged in parallel with spaced intervals; and
multiple second sensing traces arranged in parallel with spaced intervals and intersecting with the first sensing traces in a matrix; and
the at least one connecting board includes
a first connecting board, wherein each of the extending traces on the first connecting board electrically connects to a corresponding one of the first sensing traces; and a second connecting board, wherein each of the extending traces on the second connecting board electrically connects to a corresponding one of the second sensing traces.

12. The touchpad as claimed in claim 11, wherein the first sensing traces formed on the first side of the sensing panel;

the second sensing traces formed on the second side of the sensing panel;

the first connecting board and the second connecting board connect to the second side of the sensing panel;

the sensing panel has multiple conductive through-holes formed therethrough; and each of the extending traces on the first connecting board electrically connects to the corresponding one of the first sensing traces through a corresponding one of the conductive through-holes.

\* \* \* \* \*